(12) United States Patent
Kato et al.

(10) Patent No.: US 12,478,073 B2
(45) Date of Patent: Nov. 25, 2025

(54) SOLID FOOD AND SOLID MILK

(71) Applicant: MEIJI CO., LTD., Tokyo (JP)

(72) Inventors: Aya Kato, Tokyo (JP); Tetsu Kamiya, Tokyo (JP); Koji Yamamura, Tokyo (JP)

(73) Assignee: MEIJI CO., LTD., Tokyo (JP)

( * ) Notice: Subject to any disclaimer, the term of this patent is extended or adjusted under 35 U.S.C. 154(b) by 397 days.

(21) Appl. No.: 18/018,680

(22) PCT Filed: Mar. 12, 2021

(86) PCT No.: PCT/JP2021/009959
§ 371 (c)(1),
(2) Date: Jan. 30, 2023

(87) PCT Pub. No.: WO2022/024447
PCT Pub. Date: Feb. 3, 2022

(65) Prior Publication Data
US 2023/0301319 A1    Sep. 28, 2023

(30) Foreign Application Priority Data
Jul. 31, 2020 (JP) .................................. 2020-131184

(51) Int. Cl.
A23C 9/18      (2006.01)
A23P 10/28     (2016.01)
A23P 30/10     (2016.01)

(52) U.S. Cl.
CPC ..................................... *A23C 9/18* (2013.01)

(58) Field of Classification Search
CPC ... A23C 9/18; A23L 5/36; A23P 10/28; A23P 30/10
See application file for complete search history.

(56) References Cited

U.S. PATENT DOCUMENTS

| | | |
|---|---|---|
| 8,828,471 B2 | 9/2014 | Shibata et al. |
| 2009/0175998 A1 | 7/2009 | Shibata |
| 2011/0244107 A1 | 10/2011 | Toyoda et al. |
| 2013/0078357 A1 | 3/2013 | Shibata et al. |
| 2014/0017367 A1 | 1/2014 | Rastello-De Boisseson et al. |
| 2017/0251686 A1 | 9/2017 | Chaurin et al. |
| 2022/0322688 A1 | 10/2022 | Kato et al. |
| 2022/0346431 A1 | 11/2022 | Hanyu et al. |
| 2022/0354143 A1 | 11/2022 | Hanyu et al. |

FOREIGN PATENT DOCUMENTS

| | | |
|---|---|---|
| EP | 3 791 727 | 3/2021 |
| EP | 3 861 861 | 8/2021 |
| EP | 4 029 378 | 7/2022 |
| JP | 49-130189 | 11/1974 |
| JP | 62-115255 | 5/1987 |
| JP | 2007-307592 | 11/2007 |
| JP | 2008-290145 | 12/2008 |
| JP | 2012-196228 | 10/2012 |
| JP | 5350799 | 11/2013 |
| JP | 5688020 | 3/2015 |
| JP | 2017-134085 | 8/2017 |
| JP | 2018-43287 | 3/2018 |
| WO | 2007/077970 | 7/2007 |
| WO | 2010/073724 | 7/2010 |
| WO | 2011/158480 | 12/2011 |
| WO | 2019/188340 | 10/2019 |

OTHER PUBLICATIONS

Extended European Search Report issued Jul. 23, 2024 in European Patent Application No. 21849532.3.
Mitsuho Shibata, "Development of Production Technology for Compressed Baby Milk Powder", Pharm Tech Japan, Jiho, Inc. JP, XP009542299, Nov. 30, 2016, vol. 33, No. 8, pp. 173-177, with English Abstract.
International Search Report (ISR) issued May 18, 2021 in International (PCT) Application No. PCT/JP2021/009959.
R.W. Bell et al., "Foam Spray Drying Methods of Making Readily Dispersible Nonfat Dry Milk", Journal of Dairy Science, vol. 46, Issue 12, pp. 1352-1356, Dec. 1963, cited in the specification.
"Determination of Free Fat on the Surface of Milk Powder Particles", Analytical Method for Dry Milk Products, A/S Niro Atomizer, 1978, cited in the specification.
Mitsuho Shibata et al., "Investigation of measuring free fat in powdered milk", Nippon Shokuhin Kagaku Kogaku Kaishi, vol. 53, No. 10, pp. 551-554, 2006, cited in the specification.

*Primary Examiner* — Erik Kashnikow
*Assistant Examiner* — Janice Y Silverman
(74) *Attorney, Agent, or Firm* — Wenderoth, Lind & Ponack, L.L.P.

(57) ABSTRACT

Provided are a solid food and a solid milk which have suitable solubility and strength adequate to resist breakage during handling. The solid food is a solid food having a solid form obtained by compression molding a food powder, in which an increase in total crystallization rate that is a difference of a crystal ratio with respect to a total weight on a surface of the solid food relative to a crystal ratio in an inner part of the solid food is 0.1% by weight or less. Further, a depth from the surface of the solid food at which the increase in total crystallization rate is zero or minimal is 0.2 mm or less.

2 Claims, 4 Drawing Sheets

SOLID FOOD AND SOLID MILK

TECHNICAL FIELD

The present invention relates to a solid food and a solid milk.

BACKGROUND ART

As a solid food, a solid milk obtained by compression molding a powdered milk is known (see PTL 1 and PTL 2). This solid milk is required to have such solubility that it quickly dissolves when placed in warm water. At the same time, transportation suitability, that is, resistance to breakage, such as cracking or collapse occurring during transportation or carrying, is also required.

As a tablet press for compression molding a food powder including a powdered milk, a tablet press in which a slide plate having two die hole positions is horizontally reciprocated (see PTL 3) is known.

CITATION LIST

Patent Literature

PTL 1: Japanese Patent No. 5,350,799
PTL 2: Japanese Patent No. 5,688,020
PTL 3: JP-A-2007-307592

SUMMARY OF THE INVENTION

Technical Problem

It is desired that a food powder or a powdered milk is compression molded to produce a solid food and a solid milk which have strength adequate to resist breakage during handling and improved solubility.

An object of the present invention is to provide a solid food and a solid milk which have suitable solubility and strength adequate to resist breakage during handling.

Solution to Problem

A solid food of the present invention is a solid food having a solid form obtained by compression molding a food powder, in which an increase in total crystallization rate that is a difference of a crystal ratio with respect to a total weight on a surface of the solid food relative to a crystal ratio in an inner part of the solid food is 0.1% by weight or less.

A solid milk of the present invention is a solid milk having a solid form obtained by compression molding a powdered milk, in which an increase in total crystallization rate that is a difference of a crystal ratio with respect to a total weight on a surface of the solid milk relative to a crystal ratio in an inner part of the solid milk is 0.1% by weight or less.

Advantageous Effects of the Invention

According to the present invention, in the solid food having the solid form obtained by compression molding the food powder, an increase in total crystallization rate that is a difference of a crystal ratio with respect to a total weight on a surface of the solid food relative to a crystal ratio in an inner part of the solid food is 0.1% by weight or less. The solid food in which an increase in total crystallization rate on a surface of the solid food is 0.1% by weight or less can be produced by performing a hardening treatment on a compression molded body of the food powder obtained by compression molding the food powder by, for example, laser light irradiation, and suitable solubility can be realized by securing strength adequate to resist breakage during handling.

In addition, according to the present invention, in the solid milk having the solid form obtained by compression molding the powdered milk, an increase in total crystallization rate that is a difference of a crystal ratio with respect to a total weight on a surface of the solid milk relative to a crystal ratio in an inner part of the solid milk is 0.1% by weight or less. The solid milk in which an increase in total crystallization rate on a surface of the solid milk is 0.1% by weight or less can be produced by performing a hardening treatment on a compression molded body of the powdered milk obtained by compression molding the powdered milk by, for example, laser light irradiation, and suitable solubility can be realized by securing strength adequate to resist breakage during handling.

DESCRIPTION OF EMBODIMENTS

Hereinafter, embodiments of the present invention will be described. However, the embodiment to be described below is merely an example and can be appropriately modified within an apparent range for those skilled in the art.

First Embodiment (Configuration of Solid Milk 10S)

Figure 1:
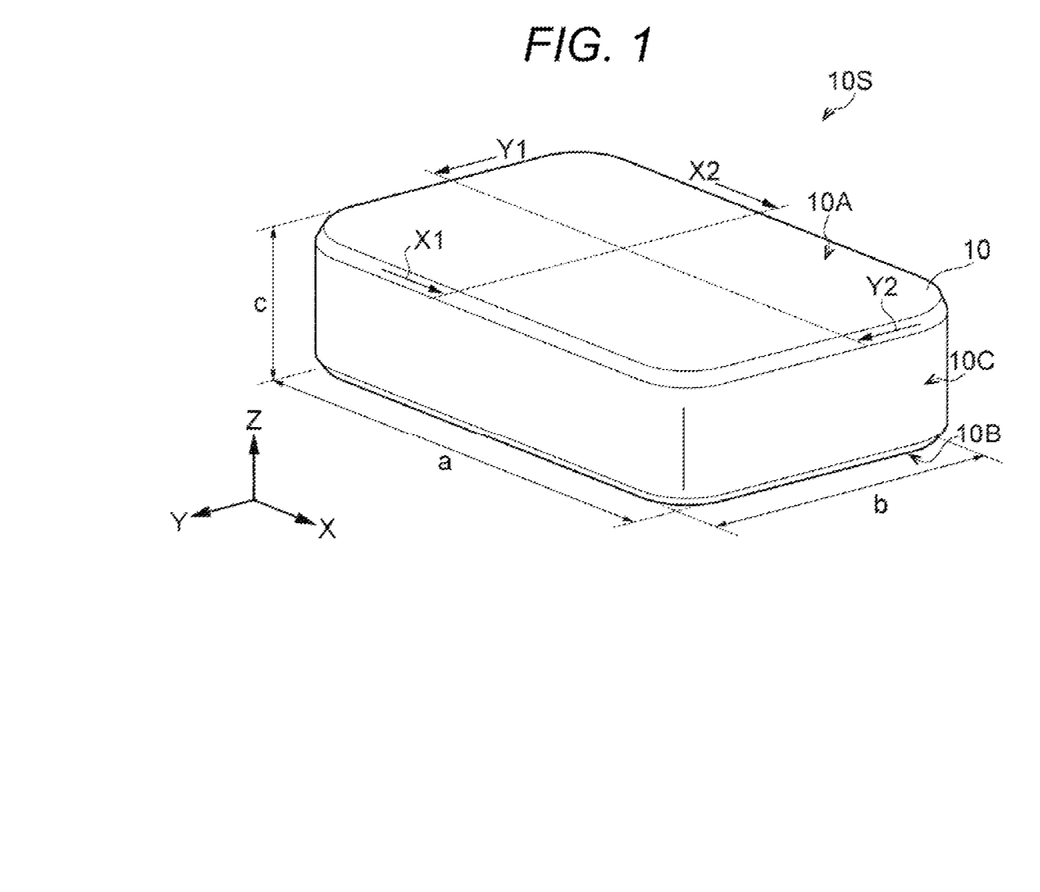
FIG. 1 is a perspective view of a solid milk according to a first embodiment.
Figure 2:
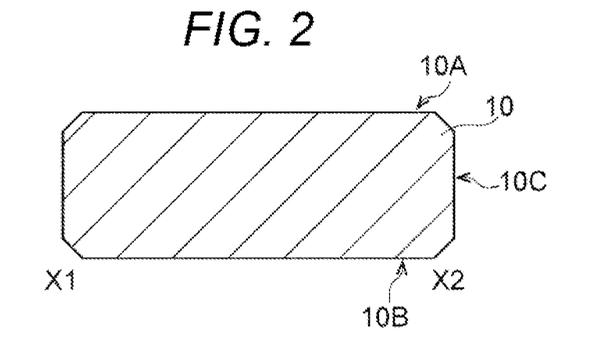
FIG. 2 is a cross-sectional view taken along X1-X2 of the solid milk of FIG. 1.
Figure 3:
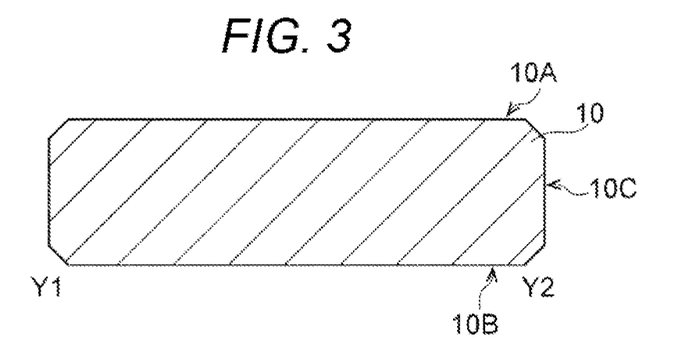
FIG. 3 is a cross-sectional view taken along Y1-Y2 of the solid milk of FIG. 1.

FIG. 1 is a perspective view of a solid milk 10S according to the present embodiment. FIG. 2 is a cross-sectional view taken along line X1-X2 of the solid milk 10S of FIG. 1. FIG. 3 is a cross-sectional view taken along line Y1-Y2 of the solid milk 10S of FIG. 1.

The solid milk 10S has a body 10 having a solid form obtained by compression molding a powdered milk. The body 10 has a first face 10A that is flat and parallel to an XY plane and a second face 10B that is flat and parallel to the XY plane. The first face 10A and the second face 10B are faces facing each other back to back. The shape of the body 10 is determined depending on the shape of a mold (a die of a tablet press) used in compression molding, but is not particularly limited as long as it is a shape having a certain degree of dimension (size, thickness, angle). The schematic shape of the body 10 is a round column shape, an elliptical column shape, a cubic shape, a rectangular parallelepiped shape, a plate shape, a polygonal column shape, a polygonal pyramid shape, a polyhedron shape, or the like. From the viewpoint of simplicity of molding, convenience of transportation, or the like, a round column shape, an elliptical column shape, and a rectangular parallelepiped shape are preferred. The schematic shape of the body 10 of the solid milk 10S illustrated in each of FIGS. 1 to 3 is a rectangular parallelepiped shape having a dimension of a×b×c (see FIG. 1) and the body 10 has a lateral face 10C parallel to the XZ plane or the YZ plane. Each of a corner part configured by the first face 10A and the lateral face 10C and a corner part configured by the second face 10B and the lateral face 10C is chamfered to have a tapered shape. In the case of the corner part being chamfered, the situation of the solid milk 10S being fractured when being transported, etc. can be suppressed.

A surface is a face that forms the outside of a material. A surface layer is a layer near the surface (vicinity of the surface) including the surface. For example, the surface layer is a layer formed by compression molding a powdered milk and further hardening through the hardening treatment. The surface layer of the present embodiment is a harder layer than the inner part. Herein, a state in which the surface layer is a harder layer than the inner part indicates that a power necessary for peeling off a thin layer is larger in the surface than in the inner part.

The solid milk 10S of the present embodiment is a solid milk having a solid form obtained by compression molding and hardening a powdered milk. Here, an increase in total crystallization rate that is a difference of a crystal ratio with respect to a total weight on a surface of the solid milk relative to a crystal ratio in an inner part of the solid milk is 0.1% by weight or less.

The total crystallization rate is a crystal ratio (% by weight) with respect to the total weight. The increase in total crystallization rate is defined as a difference obtained by subtracting a crystallization rate of crystals present before the hardening treatment from a crystallization rate of the sum of the crystals present before the hardening treatment and crystals increased by the hardening treatment. The crystallization rate of the crystals present before the hardening treatment corresponds to a crystallization rate of crystals in the inner part of the solid milk having no or substantially no influence of the hardening treatment. That is, the increase in total crystallization rate is a difference of the crystal ratio with respect to the total weight relative to the crystal ratio in the inner part of the solid milk. Examples of the crystal include α-lactose crystals and β-lactose crystals.

The increase in total crystallization rate on the surface of the solid milk is an increase in total crystallization rate obtained in a measurement region including the surface. The measurement region can be appropriately selected at the time of measurement of the increase in total crystallization rate.

The inner part of the solid milk refers to a region in which the total crystallization rate does not vary or does not substantially vary before and after the hardening treatment, and for example, is a central portion of the solid milk or a portion in the vicinity of the center of the solid milk. Specifically, the inner part of the solid milk is in a cubic range of +1 mm from the center of the solid milk in an XYZ direction or a spherical range having a radius of 1 mm from the center of the solid milk. The hardening treatment will be described in detail, and is a treatment performed for hardening a compression molded body of a powdered milk when producing a solid milk.

In the above description, the inner part of the solid milk refers to a region in which the total crystallization rate does not vary or does not substantially vary before and after the hardening treatment, and for example, the central portion of the solid milk or the portion in the vicinity of the center of the solid milk will be described, but the inner part of the solid milk may be simply a central portion of the solid milk or the portion in the vicinity of the center of the solid milk regardless of whether or not the total crystallization rate varies before and after the hardening treatment.

The increase in total crystallization rate is preferably 0.1% by weight or less, more preferably 0.05% by weight or less, and still more preferably 0.01% by weight or less.

In the solid milk, in general, the increase in total crystallization rate is high on a surface where the influence of the hardening treatment is large, and the increase in total crystallization rate decreases as the depth is larger in the inner part of the solid milk where the influence of the hardening treatment is small. In the solid milk of the present embodiment, the increase in total crystallization rate on the surface of the solid milk is 0.1% by weight or less, and the increase in total crystallization rate from the surface of the solid milk to the inner part of the solid milk is also 0.1% by weight or less.

In the solid milk 10S of the present embodiment, a depth from the surface of the solid milk at which the increase in total crystallization rate is zero or minimal is preferably 0.2 mm or less, more preferably 0.1 mm or less, and still more preferably 0.05 mm or less.

The increase in total crystallization rate can be determined as a total crystallization rate of the entire surface by cutting the surface by a thickness of 0.1 mm for each XRD measurement of the measurement surface of the sample by, for example, an X-ray diffraction (XRD) method. In addition, the increase in total crystallization rate can be measured with accuracy of, for example, about 0.05 mm to 0.1 mm in a depth direction of the sample with an XRD measuring apparatus performing two-dimensional mapping.

One or two or more holes penetrating the body 10 from the first face 10A to reach to the second face 10B may be provided in the body 10. The shape of the hole is an oval shape, a rounded rectangle shape, an elliptical shape, a round shape, a rectangular shape, a square shape, or other polygonal shapes, for example, in a cross-section parallel to the XY plane. The position of the hole is preferably a position without significant unevenness when viewed from the central position of the first face 10A, and for example, the position is an arrangement that is point-symmetric with respect to the central position of the first face 10A or an arrangement that is line-symmetric with respect to a line parallel to an X axis passing through the center of the first face 10A or a line parallel to a Y axis. In the case of providing one hole, the hole is provided, for example, at the center of the first face 10A. In the case of providing a hole, the edge of the hole may be a tapered inclined face. Incidentally, in the case of providing a hole, the inner surface of the hole is a surface harder than the inner part similarly to the first face 10A.

The components of the solid milk 10S are basically the same as components of the powdered milk as a raw material. The components of the solid milk 10S are, for example, fats, proteins, sugars, minerals, vitamins, moisture, and the like.

The powdered milk is produced from a liquid type milk (liquid milk) containing milk components (for example, components of a cow milk). The milk components are, for example, a raw milk (whole milk), a skimmed milk, cream, and the like. The moisture content ratio of the liquid milk is, for example, 40% by weight to 95% by weight. The moisture content ratio of the powdered milk is, for example, 1% by weight to 5% by weight. Nutritional components to be described below may be added to the powdered milk. The powdered milk may be a whole powdered milk, a powdered skimmed milk, or a creamy powder as long as it is suitable for producing the solid milk 10S. It is preferable that the content ratio of fat in the powdered milk is, for example, 5% by weight to 70% by weight.

The milk components which are used as a raw material for the powdered milk are, for example, derived from a raw milk. Specifically, the milk components are derived from a raw milk of cows (Holstein cows, Jersey cows, and the like), goats, sheep, buffalos, and the like. Fat components are contained in the raw milk, but a milk in which a part or the whole of the fat components are removed by centrifugal separation or the like to adjust the content ratio of fat may be used.

Further, the milk components which may be used as raw materials for the powdered milk are, for example, vegetable milk derived from a plant. Specific examples thereof include those derived from plants such as soybean milk, rice milk, coconut milk, almond milk, hemp milk, and peanut milk. Fat components are contained in the vegetable milk, but a milk in which a part or the whole of the fat components are removed by centrifugal separation or the like to adjust the content ratio of fat may be used.

The nutritional components which are used as a raw material for the powdered milk are, for example, fats, proteins, sugars, minerals, vitamins, and the like. One kind or two or more kinds of these may be added.

Proteins which may be used as a raw material for the powdered milk are, for example, milk proteins and milk protein fractions, animal proteins, vegetable proteins, peptides and amino acids of various chain length obtained by decomposing those proteins with enzymes etc., and the like. One kind or two or more kinds of these may be added. Milk proteins are, for example, casein, whey proteins ($\alpha$-lactoalbumin, $\beta$-lactoglobulin, and the like), whey protein concentrate (WPC), whey protein isolate (WPI), and the like. Animal proteins are, for example, egg protein. Vegetable proteins are, for example, soybean protein and wheat protein. Examples of the amino acids include taurine, cystine, cysteine, arginine, and glutamine.

Fats (oils and fats) which may be used as a raw material for the powdered milk are animal oils and fats, vegetable oils and fats, fractionated oils, hydrogenated oils, and transesterified oils thereof. One kind or two or more kinds of these may be added. Animal oils and fats are, for example, milk fat, lard, beef tallow, fish oil, and the like. Vegetable oils and fats are, for example, soybean oil, rapeseed oil, corn oil, coconut oil, palm oil, palm kernel oil, safflower oil, cotton seed oil, linseed oil, medium chain triglyceride (MCT) oil, and the like.

Sugars which may be used as a raw material for the powdered milk are, for example, oligosaccharides, monosaccharides, polysaccharides, artificial sweeteners, and the like. One kind or two or more kinds of these may be added. Oligosaccharides are, for example, milk sugar, cane sugar, malt sugar, galacto-oligosaccharides, fructo-oligosaccharides, lactulose, and the like. Monosaccharides are, for example, grape sugar, fruit sugar, galactose, and the like. Polysaccharides are, for example, starch, soluble polysaccharides, dextrin, and the like. Incidentally, instead of or in addition to artificial sweeteners of sugars, non-sugar artificial sweeteners may be used.

Minerals which may be used as a raw material for the powdered milk are, for example, sodium, potassium, calcium, magnesium, iron, copper, zinc, and the like. One kind or two or more kinds of these may be added. Incidentally, instead of or in addition to sodium, potassium, calcium, magnesium, iron, copper, and zinc of minerals, either or both of phosphorus and chlorine may be used.

In the solid milk 10S, a large number of pores (for example, fine pores) generated when a powdered milk as a raw material for the solid milk 10S is compression molded exist. These plurality of pores are dispersed (distributed) corresponding to the packing fraction profile in the depth direction of the solid milk 10S. As the pore is larger (wider), a solvent such as water is easy to penetrate, so that the solid milk 10S can be rapidly dissolved. On the other hand, when the pore is too large, the hardness of the solid milk 10S may be reduced or the surface of the solid milk 10S may become coarse. The dimension (size) of each pore is, for example, 10 μm to 500 μm.

The solid milk 10S is required to have a certain degree of solubility to a solvent such as water. The solubility can be evaluated, for example, by a time for the solid milk 10S to completely dissolve or the amount of non-dissolved residues at a predetermined time when the solid milk 10S as a solute and water as a solvent are prepared to have a predetermined concentration.

It is preferable that the solid milk 10S has a predetermined range of hardness. The hardness can be measured by a known method. In the present specification, the hardness is measured by using a load cell tablet hardness tester. The solid milk 10S having a rectangular parallelepiped shape is placed on the load cell tablet hardness tester while the second face 10B of the solid milk 10S is set to a bottom face, is fixed by using one face parallel to the XZ plane and one face parallel to the YZ plane of the lateral face 10C, and is pushed by a fracture terminal of the hardness tester at a constant speed from another face side, which is not fixed and is parallel to the XZ plane, of the lateral face 10C in a minor axis direction of the first face 10A (Y-axis direction in FIG. 1) toward a direction in which the YZ plane is a fracture face, and a loading [N] when fracturing the solid milk 10S is regarded as a hardness (tablet hardness) [N] of the solid milk 10S. In the case of the solid milk 10S, the measurement point is selected from a point at which distances between the first face 10A and the second face 10B on the line segment intersecting a plane parallel to the YZ plane, in which distances between a pair of the YZ planes of the lateral face 10C are equal, with the XZ plane of the lateral face 10C, are equal. For example, a load cell tablet hardness tester (PORTABLE CHECKER PC-30) manufactured by OKADA SEIKO CO., LTD. is used. The fracture terminal built in the hardness tester has a contact face being in contact with the solid milk 10S. The contact face of the fracture terminal is a rectangle of 1 mm×24 mm and is disposed in a direction in which the long axis of the rectangle is parallel to the Z axis. The contact face of the fracture terminal is configured to push a measurement point of the solid milk 10S in at least a part thereof. The speed of the fracture terminal pushing the solid milk 10S is set to 0.5 mm/s. The measurement of the hardness is not limited to the solid milk 10S and can also be applied to the case of measuring the hardness of a compression molded body of the powdered milk (unhardened solid milk 10S) described below. Regarding the hardness measured as described above, in order to avoid the situation of the solid milk 10S being fractured when the solid milk 10S is transported, etc. as much as possible, the hardness of the solid milk 10S is preferably 20 N or more and more preferably 40 N or more. On the other hand, since the solubility of the solid milk 10S deteriorates when the hardness of the solid milk 10S is too high, the hardness of the solid milk 10S is preferably 100 N or less and more preferably 70 N or less.

The hardness used herein is a physical quantity of power having a unit of [N (newton)]. The hardness increases as a fractured area of a solid milk sample becomes larger. Herein, the term "fracture" indicates that, when a vertical loading is statically applied to a sample such as the solid milk 10S, the sample is fractured, and a cross-sectional area generated when the sample is fractured is referred to as a "fractured area". That is, the hardness [N] is a physical quantity dependent on the dimension of the solid milk sample. There is mentioned a fracture stress [N/m$^2$] as a physical quantity not dependent on the dimension of the solid milk sample. The fracture stress is a power applied per unit fractured area at the time of the sample being fractured, is not dependent on the dimension of the solid milk sample, and is an index with which mechanical actions applied to solid milk samples can be compared even between solid milk samples having different dimensions. Fracture stress=Hardness/Fractured area is established. The description has been simply given using the hardness [N] in this specification, but the hardness may be represented as the fracture stress [N/m$^2$] obtained by dividing the hardness by the fractured area. When the fracture stress is calculated, a fractured face is assumed, and the fracture stress is calculated using the minimum fractured area in the assumed fractured face. For example, in the case of the solid milk 10S, an ideal fractured area is represented by a dimension b×c that is a fractured area in the face including a line passing through the center of the solid milk and parallel to the Z axis. For example, in a case where the dimension of the schematic shape of the solid milk 10S is a rectangular parallelepiped shape of 31 mm (a)×24 mm (b)×12.5 mm (c), an ideal fractured area is 300 mm$^2$ (24 mm (b)×12.5 mm (c)). The preferred hardness range of the solid milk 10S that is 20 N or more and 100 N or less corresponds to a preferred fracture stress range that is 0.067 N/mm$^2$ or more and 0.33 N/mm$^2$ or less obtained by dividing the hardness by the fractured area (300 mm$^2$). For example, a preferred range of the fracture stress of the solid milk 10S is 0.067 N/mm$^2$ or more and 0.739 N/mm$^2$ or less, considering the range of the fractured area.

(Method for Producing Solid Milk 10S)

Next, the method for producing the solid milk 10S will be described. First, a powdered milk which is used as a raw material for the solid milk 10S is produced. In a process of producing a powdered milk, a powdered milk is produced, for example, by a liquid milk preparation step, a liquid milk clarification step, a sterilization step, a homogenization step, a condensation step, a gas dispersion step, and a spray drying step.

The liquid milk preparation step is a step of preparing a liquid milk of the above-described components.

The clarification step is a step for removing fine foreign matters contained in the liquid milk. In order to remove these foreign matters, for example, a centrifuge, a filter, and the like may be used.

The sterilization step is a step for killing microorganisms such as bacteria contained in water, milk components, or the like of the liquid milk. Since microorganisms, which are considered to be actually contained, are changed depending on the type of the liquid milk, sterilization conditions (a sterilization temperature and a retention time) are appropriately set according to the microorganisms.

The homogenization step is a step for homogenizing the liquid milk. Specifically, the particle diameter of solid components such as fat globules contained in the liquid milk is decreased, and these components are uniformly dispersed into the liquid milk. In order to decrease the particle diameter of solid components of the liquid milk, for example, the liquid milk may be caused to pass through a narrow gap while being pressurized.

The condensation step is a step for condensing the liquid milk before the spray drying step to be described below. In condensation of the liquid milk, for example, a vacuum evaporator or an evaporator may be used. Condensation conditions are appropriately set within a range that components of the liquid milk are not excessively altered. According to this, a condensed milk can be obtained from the liquid milk. Subsequently, in the present invention, it is preferable that a gas is dispersed into the condensed liquid milk (condensed milk) and then spray drying is performed. In this case, the moisture content ratio of the condensed milk is, for example, 35% by weight to 60% by weight, and is preferably 40% by weight to 60% by weight and more preferably 40% by weight to 55% by weight. When such a condensed milk is used and a gas is dispersed, decreasing the density of the condensed milk makes the condensed milk bulky, and the condensed milk in a bulky state in this way is sprayed and dried, so that a powdered milk having preferable characteristics when a solid milk is produced can be obtained. Incidentally, in a case where the moisture of the liquid milk is small or the treated amount of the liquid milk to be subjected to the spray drying step is small, this step may be omitted.

The gas dispersion step is a step for dispersing a predetermined gas into the liquid milk. In this case, the predetermined gas the volume of which is, for example, $1\times10^{-2}$ times or more and 7 times or less the volume of the liquid milk is dispersed, and the volume thereof is preferably $1\times10^{-2}$ times or more and 5 times or less the volume of the liquid milk, more preferably $1\times10^{-2}$ times or more and 4 times or less the volume of the liquid milk, and most preferably $1\times10^{-2}$ times or more and 3 times or less.

The predetermined gas is preferably pressured in order to disperse the predetermined gas into the liquid milk. The pressure for pressurizing the predetermined gas is not particularly limited as long as it is within a range enabling the gas to effectively disperse into the liquid milk, but the atmospheric pressure of the predetermined gas is, for example, 1.5 atm or more and 10 atm or less and preferably 2 atm or more and 5 atm or less. Since the liquid milk is sprayed in the following spray drying step, the liquid milk flows along a predetermined flow passage, and in this gas dispersion step, by running the predetermined gas pressurized into this flow passage, the gas is dispersed (mixed) into the liquid milk. By doing so, the predetermined gas can be easily and certainly dispersed into the liquid milk.

As described above, through the gas dispersion step, the density of the liquid milk is decreased, and the apparent volume (bulk) is increased. Incidentally, the density of the liquid milk may be obtained by dividing the weight of the liquid milk by the total volume of the liquid milk at a liquid state and a bubble state. In addition, the density of the liquid milk may be measured using an apparatus measuring a density according to the bulk density measurement (pigment: JIS K 5101 compliant) method based on JIS method.

Therefore, the liquid milk in a state where the predetermined gas is dispersed flows in the flow passage. Herein, the volume flow rate of the liquid milk in the flow passage is preferably controlled to be constant.

In the present embodiment, carbon dioxide (carbon dioxide gas) can be used as the predetermined gas. In the flow passage, the ratio of the volume flow rate of carbon dioxide to the volume flow rate of the liquid milk (hereinafter, the percentage thereof is also referred to as "$CO_2$ mixing ratio [%]") is, for example, 1% or more and 700% or less, preferably 2% or more and 300% or less, more preferably 3% or more and 100% or less, and most preferably 5% or more and 45% or less. As described above, by controlling the volume flow rate of the carbon dioxide to be constant to the volume flow rate of the liquid milk, homogeneousness of the powdered milk produced from this liquid milk can be enhanced. However, when the $CO_2$ mixing ratio is too large, the percentage of the liquid milk flowing in the flow passage is decreased so that the production efficiency of the powdered milk deteriorates.

Therefore, the upper limit of the $CO_2$ mixing ratio is preferably 700%. In addition, the pressure for pressurizing the carbon dioxide is not particularly limited as long as it is within a range enabling the carbon dioxide to effectively disperse into the liquid milk, but the atmospheric pressure of the carbon dioxide is, for example, 1.5 atm or more and 10 atm or less and preferably 2 atm or more and 5 atm or less. Incidentally, by mixing continuously (in-line mixing) carbon dioxide and the liquid milk in a seal-up system, it is possible to certainly prevent bacteria or the like from being mixed so that the hygienic status of the powdered milk can be enhanced (or high cleanliness can be maintained).

In the present embodiment, the predetermined gas used in the gas dispersion step was carbon dioxide gas. Instead of carbon dioxide gas or with carbon dioxide gas, one or two or more gases selected from the group consisting of air, nitrogen ($N_2$), and oxygen ($O_2$) may be used or rare gas (for example, argon (Ar) or helium (He)) may be used. As described above, since various gases can be options, the gas dispersion step can be easily performed by using a gas easily available. In the gas dispersion step, when an inert gas such as nitrogen or rare gas is used, there is no possibility to react with nutritional components of the liquid milk or the like, and thus, it is preferable rather than using air or oxygen since there is less possibility to deteriorate the liquid milk. In this case, the ratio of the volume flow rate of the gas to the volume flow rate of the liquid milk is, for example, 1% or more and 700% or less, preferably 1% or more and 500% or less, more preferably 1% or more and 400% or less, and most preferably 1% or more and 300% or less. For example, according to Bell et al, (R. W. BELL, F. P. HANRAHAN, B. H. WEBB: "FOAM SPRAY DRYING METHODS OF MAKING READILY DISPERSIBLE NONFAT DRY MILK", J. Dairy Sci, 46 (12) 1963. pp. 1352-1356), air having about 18.7 times the volume of non-fat milk is dispersed into non-fat milk to obtain a powdered skimmed milk. In the present invention, by dispersing the gas within the above range, a powdered milk having characteristics preferable for producing a solid milk can be obtained. However, to certainly decrease the density of the liquid milk as a result of having dispersed the predetermined gas into a liquid milk in the gas dispersion step, it is preferable to use, as the predetermined gas, a gas which is easily dispersed into the liquid milk or a gas which is easily dissolved in the liquid milk. Therefore, a gas having a high degree of solubility in water (water solubility) is preferably used, and a gas in which a degree of solubility at 20° C. and one atmosphere in 1 $cm^3$ of water is 0.1 $cm^3$ or more is preferred. Incidentally, carbon dioxide is not limited to a gas and may be dry ice or a mixture of dry ice and a gas. That is, in the gas dispersion step, a solid may be used as long as a predetermined gas can be dispersed into the liquid milk. In the gas dispersion step, carbon dioxide can be rapidly dispersed into the liquid milk in a cooling state by using dry ice, and as a result, a powdered milk having characteristics preferable for producing a solid milk can be obtained.

The spray drying step is a step for obtaining a powdered milk (food powder) by evaporating moisture in the liquid milk. The powdered milk obtained in this spray drying step is a powdered milk obtained through the gas dispersion step and spray drying step. This powdered milk is bulky as compared to a powdered milk obtained not through the gas dispersion step. The volume of the former is preferably 1.01 times or more and 10 times or less that of the latter, may be 1.02 times or more and 10 times or less or 1.03 times or more and 9 times or less.

In the spray drying step, the liquid milk is spray dried in a state where the predetermined gas is dispersed into the liquid milk in the gas dispersion step and the density of the liquid milk becomes small. Specifically, it is preferable to spray dry the liquid milk in a state where the volume of the liquid milk after dispersing a gas is 1.05 times or more and 3 times or less, preferably 1.1 times or more and 2 times or less as compared to the volume of the liquid milk before dispersing a gas. That is, in the spray drying step, spray drying is performed after finishing the gas dispersion step. However, immediately after finishing the gas dispersion step, the liquid milk is not homogeneous. Therefore, the spray drying step is performed for 0.1 seconds or longer and 5 seconds or shorter, preferably, 0.5 seconds or longer and 3 seconds or shorter after finishing the gas dispersion step. That is, it is sufficient that the gas dispersion step and the spray drying step are continuously performed. By doing so, the liquid milk is continuously placed in a gas dispersion apparatus to disperse a gas, and the liquid milk into which the gas is dispersed is continuously supplied to a spray drying apparatus and can be continuously spray dried.

In order to evaporate moisture, a spray dryer may be used. Herein, the spray dryer includes a flow passage for flowing a liquid milk, a pressuring pump pressuring the liquid milk for flowing the liquid milk along the flow passage, a dry chamber having a wider room than that of the flow passage connecting to an opening of the flow passage, and a spraying apparatus (a nozzle, an atomizer, or the like) set at the opening of the flow passage. Further, the spray dryer transfers the liquid milk by the pressuring pump toward the dry chamber along the flow passage to be the above volume flow rate, the condensed milk is diffused by the spraying apparatus inside the dry chamber in the vicinity of the opening of the flow passage, and the liquid milk in a liquid drop (atomization) state is dried inside the dry chamber at a high temperature (for example, hot wind). That is, moisture is removed by drying the liquid milk in the dry chamber, and as a result, the condensed milk becomes a solid of a powder state, namely, a powdered milk. Incidentally, the moisture amount or the like in the powdered milk is adjusted by appropriately setting the drying condition in the drying chamber, so that it makes the powdered milk less likely to cohere. In addition, by using the spraying apparatus, the surface area per unit volume of liquid drop is increased so that drying efficiency is enhanced, and at the same time, the particle diameter or the like of the powdered milk is adjusted.

Through the steps as described above, a powdered milk suitable for producing a solid milk can be produced.

The powdered milk obtained as described above is compression molded to form a compression molded body of the powdered milk. Next, the obtained compression molded body of the powdered milk is subjected to a hardening treatment. As described above, the solid milk 10S can be produced.

In the step of compression molding the powdered milk, a compression means is used. The compression means is, for example, a pressurization molding machine such as a tablet press or a compression testing apparatus. The tablet press is an apparatus including a die serving as a mold in which a powdered milk is input and a punch capable of punching to the die. The compression molding step by the tablet press will be described below.

Figure 4:
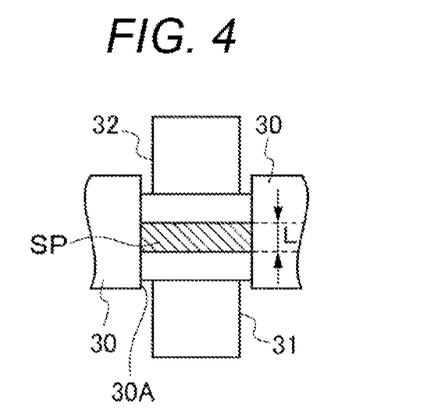
FIG. 4 is an explanatory view describing positions of a slide plate, an upper punch, and a lower punch of a tablet press.

FIG. 4 is an explanatory view describing positions of a slide plate, an upper punch, and a lower punch of a tablet press. In the compression molding zone of the tablet press, a lower punch 31 is disposed below a die 30A of a slide plate 30 to be vertically movable by an actuator. In addition, an upper punch 32 is disposed above the die 30A of the slide plate 30 to be vertically movable by an actuator. FIG. 4 illustrates the position in which the lower punch 31 and the upper punch 32 are inserted into the die 30A of the slide plate 30 and then the lower punch 31 and the upper punch 32 approach to each other closest. At this position, a distance between the lower punch 31 and the upper punch 32 is the final punch distance L. An inner surface of the die 30A of the slide plate 30, an upper end face of the lower punch 31, and a lower end face of the upper punch 32 constitute a compression molding mold. For example, a powdered milk is supplied to a concave portion configured by the inner surface of the die 30A of the slide plate 30 and an upper face of the lower punch 31, the upper punch 32 is hit from the upper side of the die 30A to apply a compression pressure to the powdered milk, the powdered milk is compression molded in a space SP surrounded by the inner surface of the die 30A of the slide plate 30, the upper end face of the lower punch 31, and the lower end face of the upper punch 32, and thus a compression molded body of the powdered milk can be obtained.

The actuator driving the lower punch 31 and the upper punch 32 up and down is configured, for example, by a servomotor. In the present embodiment, the speed of a servomotor as the actuator can be changed to change the compression speed at the time of compression molding, that is, the moving speeds of the lower punch 31 and the upper punch 32, as will be described below in detail. The actuator is not limited to a servomotor, and the technique to change the moving speeds of the lower punch 31 and the upper punch 32 is not limited thereto. For example, it is also possible to use an oil hydraulic cylinder or the like. In addition, at the time of compression molding, the lower punch 31 and the upper punch 32 may be moved in the direction to approach each other, or it is also possible that one side is fixed, and only the other side is moved.

A step of performing compression molding while changing a compression speed at the time of compression molding, that is, a moving speed of each of the lower punch 31 and the upper punch 32 will be described. At the time of this compression molding, the compression speed at which the upper end face of the lower punch 31 and the lower end face of the upper punch 32 approach to each other is changed (switched). That is, a first compression is first performed at a first compression speed $V_1$, and, following the first compression, a second compression is performed at a second compression speed $V_2$. In the present embodiment, the second compression speed $V_2$ is set to be lower than the first compression speed $V_1$.

The compression distances of the first compression and the second compression are, in this example, as illustrated in FIG. 4, based on the state at the completion of the second compression, that is, at the completion of the entire compression steps. Compression by the lower punch 31 and the upper punch 32 is performed until the punch distance between the upper end face of the lower punch 31 and the lower end face of the upper punch 32 reach the final punch distance L. The final punch distance L is the final thickness of the compression molded body of the powdered milk in the state of being compressed through the entire compression steps. This final punch distance L is determined considering that the compression molded body of the powdered milk expands upon the release of compression, and is smaller than the desired thickness of the compression molded body of the powdered milk or the same as the desired thickness.

The tablet press of the embodiment is controlled during the changeover between the first and second compression so that both sides of the lower punch 31 and upper punch 32 are in close contact with the compressed body and the pressure on the compressed body is not relieved. On the other hand, in the known tablet press (for example, a tablet press described in JP-A-2008-290145), the pressure is controlled to relieved once after preload is applied for the purpose of releasing the air contained in the compressed body and then the main pressure is applied to mold the compressed body. The tablet press used in the embodiment differs from the existing tablet presses in that it compresses the compressed body without releasing the pressure between the first and second compressions and by bringing both sides of the lower and upper punches 31 and 32 in close contact with the compressed body, thus allowing sufficient hardness of the compressed body.

Figure 5:
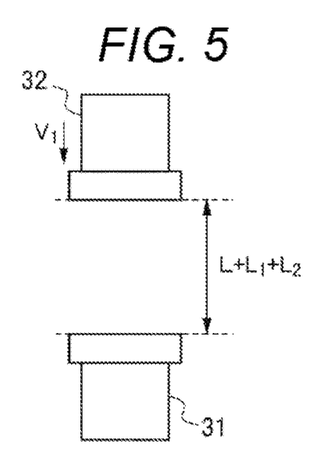
FIG. 5 is an explanatory view describing positions of the upper punch and the lower punch at the start of a first compression.
Figure 6:
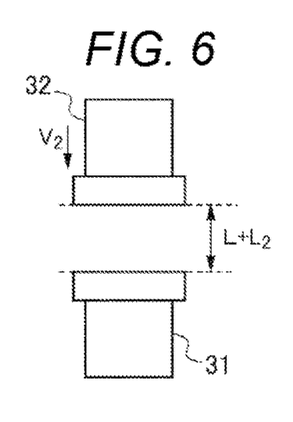
FIG. 6 is an explanatory view describing positions of the upper punch and the lower punch at the completion of the first compression and at the start of a second compression.

FIG. 5 illustrates positions of the lower punch 31 and the upper punch 32 at the start of the first compression. FIG. 6 illustrates positions of the lower punch 31 and the upper punch 32 at the completion of the first compression and at the start of the second compression. Compression from the state of the punch distance illustrated in FIG. 5 ($L+L_1+L_2$) to the state of the punch distance illustrated in FIG. 6 ($L+L_2$) is the first compression. In addition, compression from the state of the punch distance illustrated in FIG. 6 ($L+L_2$) to the state of the final punch distance L illustrated in FIG. 4 is the second compression.

The first compression distance $L_1$ of the first compression is the distance in which the punch distance decreases in the first compression. The second compression distance $L_2$ of the second compression is the distance in which the punch distance decreases in the second compression. Since the second compression is performed following the first compression without releasing the compression, the second compression distance $L_2$ is the compression distance from the punch distance ($L+L_2$) compressed in the first compression to the final punch distance (L).

The rate of change in the punch distance in the first compression is the first compression speed $V_1$, and the rate of change in the punch distance in the second compression is the second compression speed $V_2$. Incidentally, in a case where the rate of change in the punch distance varies during the first compression or the second compression, the average rate is defined as the first compression speed $V_1$ or the second compression speed $V_2$.

When the second compression is performed after the first compression at the second compression speed $V_2$ that is lower than the first compression speed $V_1$, as compared with a case where the compression is performed at the same compression speed as the first compression speed $V_1$ with the same compression distance ($L_1+L_2$), the hardness of the compression molded body of the powdered milk is increased and thus resistance to breakage can be secured. Moreover, since the second compression is performed continuously to the first compression and the second compression distance $L_2$ can be shortened, production can be performed with further improved production efficiency while having a high strength at the same level as that in the case of performing production only at the second compression speed $V_2$.

In the present embodiment, in order to efficiently enhance the hardness of the compression molded body of the powdered milk, the mode of the second compression, that is, the combination of the second compression speed $V_2$ with the second compression distance $L_2$, is determined in such a manner to satisfy the second compression conditions under which, upon the compression of the compression molded body of the powdered milk from the state of being compressed in the first compression, the compression molded body of the powdered milk is compressed to such a state that the rate of change in the hardness of the compression molded body of the powdered milk relative to the compression distance decreases.

As described above, the compression molding step is performed by combining the first compression performed at the first compression speed $V_1$ and the second compression performed at the second compression speed $V_2$ that is lower than the first compression speed $V_1$, such that the hardness of the compression molded body of the powdered milk can be efficiently improved while suppressing an increase in compression time.

The compression molding step performed by combining the first compression and the second compression is described in the above, but the whole compression molding step may be performed only at the first compression speed $V_1$. Alternatively, the compression molding step may be performed only at the second compression speed $V_2$.

The present inventors have examined compression molded bodies of the powdered milk obtained from various combinations of the first compression speed $V_1$, the first compression distance $L_1$, the second compression speed $V_2$, and the second compression distance $L_2$. As a result, they have found that when the second compression speed $V_2$ is set to be lower than the first compression speed $V_1$, there exists a specific point at which the rate of change in the hardness of a compression molded body of the powdered milk (rate of increase) relative to change in the second compression distance $L_2$ decreases (hereinafter referred to as "hardness specific point"). In addition, the inventors have also found that the second compression distance $L_2$ corresponding to the hardness specific point changes with the first compression speed $V_1$ and is also affected by the second compression speed $V_2$.

The hardness specific point exists presumably because of the change from a compression state where the rearrangement of particles of the powdered milk in the inner part of the compression molded body of the powdered milk is dominant to another compression state where plastic deformation in the inner part of the compression molded body of the powdered milk is dominant. In addition, presumably, because an increase in the first compression speed $V_1$ increases the energy required for plastic deformation in the inner part of the compression molded body of the powdered milk, the second compression distance $L_2$ corresponding to the hardness specific point changes according to the first compression speed $V_1$, and also such a second compression distance $L_2$ is affected by the second compression speed $V_2$.

Based on the above findings, the second compression is performed so as to satisfy the second compression conditions, whereby the hardness of the compression molded body of the powdered milk is efficiently and significantly improved while suppressing an increase in the compression time.

It is also preferable that the compression speed ratio ($=V_1/V_2$), which is the ratio of the first compression speed $V_1$ to the second compression speed $V_2$, is set to 5 or more. When the compression speed ratio is set to 5 or more, the hardness of the compression molded body of the powdered milk can be significantly increased. The compression speed ratio may be 5 or more, and for example, is 10 or more, 20 or more, 25 or more, 50 or more, 100 or more, 250 or more, or 500 or more.

Preferably, the first compression speed $V_1$ is set in the range of 1.0 mm/s or more and 100.0 mm/s or less, and the first compression distance $L_1$ is set in the range of 5.0 mm or more and 10.0 mm or less, and the second compression speed $V_2$ is set in the range of 0.25 mm/s or more and 50.0 mm/s or less, and the second compression distance $L_2$ is set in the range of 0.2 mm or more and 1.6 mm or less.

The configuration of the tablet press described above is an example, and the configuration is not limited as long compression can be performed at different compression speeds between the first compression and the second compression. In addition, although compression to the final thickness is performed in the second compression in this example, it is also possible to perform further compression at a rate changed from the second compression speed following the second compression. In this case, the compression molded body of the powdered milk is compressed to the final thickness by the compression later than the second compression.

The configuration of the tablet press other than the above-described configuration is, for example, the same of the tablet press described in PTL 3. For example, the die 30A of the slide plate in which the compression molding has been performed is moved to a removal zone. In the removal zone of the tablet press, the lower punch 31 and the upper punch 32 are removed from the die 30A of the slide plate 30, and the compression molded body of the powdered milk is extruded by an extrusion part. The extruded compression molded body of the powdered milk is collected by a collection tray. In the tablet press, a powdered milk supply part to the die 30A of the slide plate 30 is, for example, realized by an apparatus including a funnel supplying a powdered milk from a bottom opening to the die 30A.

In the step of compression molding the powdered milk, the ambient temperature is not particularly limited, and may be, for example, room temperature. Specifically, the ambient temperature is, for example, 5° C. to 35° C. The ambient humidity is, for example, a relative humidity of 0% RH to 60% RH. The compression pressure is, for example, 1 MPa to 30 MPa, preferably 1 MPa to 20 MPa. In particular, at the time of solidifying the powdered milk, it is preferable that the compression pressure is adjusted within a range of 1 MPa to 30 MPa and the hardness of the compression molded body of the powdered milk is controlled within a range of 4 N or more and less than 20 N. According to this, it is possible to produce a high utility solid milk 10S having convenience (easy handleability). Incidentally, the compression molded body of the powdered milk has such a hardness (for example, 4 N or more) at which the shape of the compression molded body of the powdered milk is not collapsed in at least the hardening step. For example, a preferred range of the fracture stress of the compression molded body of the powdered milk is 0.014 N/mm² or more and less than 0.067 N/mm², considering the range of the fractured area.

The hardening treatment is a step of subjecting the compression molded body of the powdered milk obtained by the compression molding step to hardening. In the present embodiment, the compression molded body of the powdered milk is hardened by, for example, irradiation with a laser light. Examples of an irradiation method can include a method of irradiating a point while scanning the point at a high speed in addition to a method of performing irradiation with a laser in a planar state with an optical system.

When the compression molded body of the powdered milk is irradiated with a laser light, some sugars in the powder particles in the vicinity of a surface of the compression molded body of the powdered milk become a non-crystalline rubber state by instant softening of a non-crystalline glass-like substance due to heat of the laser light, and the sugars are cross-linked to each other at a contact point of particles adjacent to each other as a base point and then instantly cooled by air cooling, such that the strength in the vicinity of the surface of the compression molded body by of the powdered milk can be further increased again by non-crystal vitrification (solidified at a non-crystalline state) or the like. As a result, the hardness (for example, 4 N or more and less than 20 N) of the compression molded body of the powdered milk (unhardened solid milk 10S) before the hardening step can be increased to a desired hardness (for example, 40 N) required for the solid milk 10S.

In the hardening treatment, the method of irradiating the compression molded body of the powdered milk with a laser light is not particularly limited, but as a light source of the laser light, a ruby laser, a YAG laser such as Nd:YAG, a solid laser such as a glass laser, a semiconductor laser, or a gas laser such as a $CO_2$ laser, an argon laser, or an excimer laser can be used. A wavelength of the laser light used is, for example, in a range of 100 nm or more and 11,000 nm or less, and preferably in a range of 800 nm or more and 11,000 nm or less. An intensity of the laser light used (output of the laser light) is, for example, 100 W or more and 10,000 W or less, and preferably 1,000 W or more and 8,000 W or less. The laser light from the light source is guided by an irradiation optical system including a lens and the like to irradiate the compression molded body of the powdered milk. It is possible to adjust the energy density of the light irradiated to the compression molded body of the powdered milk by adjusting a focal length of the lens incorporated in the irradiation optical system and a spot diameter of the laser light, and a preferred energy density per 1 second of an irradiation time is 450 W/cm² or more and 10,000 W/cm² or less, and more preferably 500 W/cm² or more and 1,200 W/cm² or less. In addition, the irradiation time of the laser light can be appropriately adjusted according to the degree of the hardening treatment, but is preferably 0.01 seconds or longer and 20 seconds or shorter, and more preferably 0.4 seconds or longer and 5 seconds or shorter as a preferred example.

The hardening of the compression molded body of the powdered milk by irradiation of the laser light is preferably performed under a predetermined temperature and humidity environment. For example, the relative humidity is preferably 0% RH to 30% RH. The temperature is preferably room temperature to 330° C.

In this regards, the relative humidity can be measured with a commercial hygrometer. For example, up to 180° C. it can be measured with the hygrometer HMT330 from Vaisala, and up to 350° C. with the dew point transmitters DMT345 from Vaisala. In addition, the relative humidity may also be converted by measuring the absolute humidity (volumetric absolute humidity (the unit is g/m³) or weight absolute humidity (the unit is kg/kg (DA), where DA represents dry air) and calculating the ratio (%) of water vapor partial pressure to saturation water vapor pressure at that temperature.

In the step of compression molding the powdered milk and the hardening treatment step, a range (width) of the hardness that can be increased by adjusting the hardening treatment is limited. That is, when the compression molded body of the powdered milk is transported by a belt conveyer or the like to harden the compression molded body of the powdered milk obtained after the compression molding, if the hardness of the compression molded body of the powdered milk is not sufficient, the shape of the solid milk 10S is not kept. In addition, if the hardness of the compression molded body of the powdered milk is too high during the compression molding, only the solid milk 10S having a small porosity and poor solubility is obtainable. Therefore, it is preferable to perform the compression molding so that the hardness of the compression molded body of the powdered milk before the hardening step (unhardened solid milk 10S) is sufficiently high and the solubility of the solid milk 10S is sufficiently kept.

When the moisture contained in the solid milk 10S is large, storage stability deteriorates and it is easy for deterioration in the flavor and the discoloration of appearance to progress. Therefore, in the hardening step, the moisture content ratio of the solid milk 10S is preferably controlled (adjusted) to be no more than 1% higher or lower than the moisture content ratio of the powdered milk used as a raw material by controlling the conditions such as a temperature and a time.

The solid milk 10S produced in this way is generally dissolved in warm water and drunk. Specifically, warm water is poured into a container or the like provided with a lid and then the necessary number of pieces of the solid milk 10S are placed therein, or the warm water is poured after the pieces of the solid milk 10S are placed. Then, preferably, the solid milk 10S is rapidly dissolved by lightly shaking the container and drunk in a state with an appropriate temperature. Further, preferably, when one to several pieces of the solid milks 10S (more preferably one piece of the solid milk 10S) are dissolved in warm water, the volume of the solid milk 10S may be adjusted to be a necessary amount of the liquid milk for one drinking, for example, to be 1 cm³ to 50 cm³. Incidentally, by changing the amount of the powdered milk used in the compression molding step, the volume of the solid milk 10S can be adjusted.

As described above, for example, by performing the hardening treatment by laser light irradiation, it is possible to produce a solid milk in which an increase in total crystallization rate that is a difference of a crystal ratio with respect to a total weight on a surface of the solid milk relative to a crystal ratio in an inner part of the solid milk is 0.1% by weight or less.

In the method for producing the solid milk of the present embodiment, the increase in total crystallization rate on the surface of the produced solid milk is 0.1% by weight or less, and since the increase in total crystallization rate from the surface of the solid milk to the inner part of the solid milk is also 0.1% by weight or less because it is smaller than that on the surface.

In the method for producing the solid milk of the present embodiment, the depth from the surface of the solid milk at which the increase in total crystallization rate of the produced solid milk is zero or minimal is 0.2 mm or less, more preferably 0.1 mm or less, and still more preferably 0.05 mm or less.

(Action and Effect of Solid Milk 10S)

The solid milk 10S of the present embodiment is a solid milk having a solid form obtained by compression molding a powdered milk, in which an increase in total crystallization rate that is a difference of a crystal ratio with respect to a total weight on a surface of the solid milk relative to a crystal ratio in an inner part of the solid milk is 0.1% by weight or less.

In the solid milk produced by performing a hardening treatment including a humidification treatment in which humidification is performed at a temperature of, for example, 100° C. or lower on the compression molded body of the powdered milk obtained by compression molding the powdered milk, the increase in total crystallization rate of the surface is a large value of, for example, about 6.65% by weight as described below. On the other hand, in the solid milk 10S of the present embodiment, the increase in total crystallization rate of the surface is 0.1% by weight or less, which is significantly small. Such a solid milk 10S can realize suitable solubility because the increase in total crystallization rate is small.

In addition, in the solid milk 10S of the present embodiment, the increase in total crystallization rate from the surface of the solid milk 10S to the inner part of the solid milk 10S is smaller than the increase in total crystallization rate on the surface, and is 0.1% by weight or less. Such a solid milk 10S can realize suitable solubility because the increase in total crystallization rate is small.

In addition, according to the solid milk 10S of the present embodiment, even when the solid milk 10S is hardened by a hardening treatment that has small influence on the crystallization rate from the surface to the inner part of the solid milk 10S, it is possible to sufficiently secure strength adequate to resist breakage during handling.

In the solid milk 10S of the present embodiment, the depth from the surface of the solid milk at which the increase in total crystallization rate is zero or minimal is preferably 0.2 mm or less. As a result, more suitable solubility can be realized, and strength adequate to resist breakage during handling can be sufficiently secured.

Second Embodiment

Solid milk is a type of solid food. The first embodiment described above relates to the compression molded body of the powdered milk obtained by compression molding the powdered milk and the solid milk obtained by hardening the compression molded body of the powdered milk, but the present invention is not limited thereto. In the present embodiment, the present invention is applied to a compression molded body of a food powder obtained by compression molding the food powder and a solid food obtained by hardening the compression molded body of the food powder.

For the above-described food powder, in addition to the powdered milk, for example, protein powders such as whey protein, soybean protein, and collagen peptide, amino acid powders, and oil and fat-containing powders such as MCT oil can be used. The food powder may be appropriately added with milk sugar or other sugars. Other than milk sugar or other sugars, nutritional components such as fats, proteins, minerals, and vitamins or food additives may be added to the food powder.

A compression molded body of the food powder can be formed by compression molding the food powder into a desired shape. A solid food can be formed by hardening the obtained compression molded body of the food powder. The solid food can be produced by performing the same hardening treatment as in the first embodiment, except that the above-described food powder is used as a raw material. That is, in the hardening treatment step, the compression molded body of the food powder is irradiated with, for example, a laser light.

As for the compression molded body of the food powder obtained by compression molding the food powder and the solid food obtained by hardening the compression molded body of the food powder, the hardness can be measured using the hardness tester described in the first embodiment. A preferred hardness of the compression molded body of the food powder is 4 N or more and less than 20 N, and a preferred hardness of the solid food is 20 N or more and 100 N or less. In addition, a preferred fracture stress of the compression molded body of the food powder is 0.014 $N/mm^2$ or more and less than 0.067 $N/mm^2$, and a preferred fracture stress of the solid food is 0.067 $N/mm^2$ or more and 0.739 $N/mm^2$ or less.

An increase in total crystallization rate that is a difference of a crystal ratio with respect to a total weight on a surface of the solid food of the present embodiment relative to a crystal ratio in an inner part of the solid food is 0.1% by weight or less. Such a solid food can be produced by performing a hardening treatment in which the compression molded body of the food powder obtained by compression molding the food powder is irradiated with, for example, a laser light.

In the solid food of the present embodiment, the depth from the surface of the solid milk at which the increase in total crystallization rate is zero or minimal is preferably 0.2 mm or less.

Further, the protein powders of the food powder may be milk casein, meat powder, fish powder, egg powder, wheat protein, wheat protein decomposition product, or the like. One kind or two or more kinds of these protein powders may be added.

Further, the whey protein of the food powder is a generic term for proteins other than casein in milk. It may be classified as whey proteins. Whey protein is composed of a plurality of components such as lactoglobulin, lactalbumin, and lactoferrin. When a milk raw material such as milk is adjusted to be acidic, a protein to be precipitated is casein, and a protein not to be precipitated is whey protein. Examples of the powder raw material containing whey proteins include WPC (whey protein concentrate, protein content: 75 to 85% by mass) and WPI (whey protein isolate, protein content: 85% by mass or more). One kind or two or more kinds of these may be added.

Further, the soybean protein (soybean protein) of the food powder may be a protein contained in soybean or may be extracted from soybean. It is also possible to use those purified from raw material soybeans. The purification method is not particularly limited, and a conventionally known method can be used. As such a soybean protein, a powder commercially available as a material for food and drink, a material for medical use, or a supplement food can be used. One kind or two or more kinds of these may be added.

The amino acids contained in the amino acid powders of the food powder are not particularly limited, and examples thereof include arginine, lysine, ornithine, phenylalanine, tyrosine, valine, methionine, leucine, isoleucine, tryptophan, histidine, proline, cysteine, glutamic acid, asparagine, aspartic acid, serine, glutamine, citrulline, creatine, methyllysine, acetyllysine, hydroxylysine, hydroxyproline, glycine, alanine, threonine, and cystine. One kind or two or more kinds of these may be added.

The amino acids contained in the amino acid powder of the food powder may be either a natural product or a synthetic product, and a single amino acid or a mixture of a plurality of amino acids can be used. In addition, as the amino acids, not only free amino acids but also salts such as sodium salt, hydrochloride and acetate, and derivatives such as carnitine and ornithine can be used.

In the description herein, the term "amino acids" includes α-amino acids, β-amino acids, and γ-amino acids. The amino acids may be either L-form or D-form.

Further, the oils and fats contained in the oil and fat-containing powders of the food powder are animal oils and fats, vegetable oils and fats, and fractionated oils, hydrogenated oils, and transesterified oils thereof, in addition to the MCT oil described above. One kind or two or more kinds of these may be added. Animal oils and fats are, for example, milk fat, lard, beef tallow, fish oil, and the like. Vegetable oils and fats are, for example, soybean oil, rapeseed oil, corn oil, coconut oil, palm oil, palm kernel oil, safflower oil, cotton seed oil, linseed oil, medium chain triglyceride (MCT) oil, and the like.

Further, the sugars of the food powder are, for example, oligosaccharides, monosaccharides, polysaccharides, artificial sweeteners, or the like, in addition to the milk sugar described above. One kind or two or more kinds of these may be added. Oligosaccharides are, for example, milk sugar, cane sugar, malt sugar, galacto-oligosaccharides, fructo-oligosaccharides, lactulose, and the like. Monosaccharides are, for example, grape sugar, fruit sugar, galactose, and the like. Polysaccharides are, for example, starch, soluble polysaccharides, dextrin, and the like.

Further, as an example of the food additives of the food powder, sweeteners can be exemplified. The sweeteners may be any sweetener commonly used in foods and pharmaceuticals, and may be either a natural sweetener or a synthetic sweetener. The sweeteners are not particularly limited, and examples thereof include glucose, fructose, maltose, sucrose, oligosaccharide, sugar, granulated sugar, maple syrup, honey, molasses, trehalose, palatinose, maltitol, xylitol, sorbitol, glycerin, aspartame, advantame, neotame, sucralose, acesulfame potassium, and saccharin.

Further, as an example of the food additives of the food powder, acidulants can be exemplified. The acidulants are not particularly limited, and examples thereof include acetic acid, citric acid, anhydrous citric acid, adipic acid, succinic acid, lactic acid, malic acid, phosphoric acid, gluconic acid, tartaric acid, and salts thereof. The acidulants can suppress (mask) bitterness caused by the type of the amino acids.

Further, the food powder may contain any components such as fats, proteins, minerals, and vitamins as nutritional components.

Examples of the fats include animal oils and fats, vegetable oils and fats, fractionated oils, hydrogenated oils, and transesterified oils thereof. One kind or two or more kinds of these may be added. Animal oils and fats are, for example, milk fat, lard, beef tallow, fish oil, and the like. Vegetable oils and fats are, for example, soybean oil, rapeseed oil, corn oil, coconut oil, palm oil, palm kernel oil, safflower oil, cotton seed oil, linseed oil, medium chain triglyceride (MCT) oil, and the like.

The proteins, for example, milk proteins and milk protein fractions, animal proteins, vegetable proteins, peptides and amino acids of various chain length obtained by decomposing those proteins with enzymes etc., and the like. One kind or two or more kinds of these may be added. Milk proteins are, for example, casein, whey proteins (α-lactoalbumin, β-lactoglobulin, and the like), for example, whey protein concentrate (WPC), whey protein isolate (WPI), and the like. Examples of the animal proteins include egg protein (egg powder), meat powder, and fish powder. Examples of the vegetable proteins include soybean protein and wheat protein. Examples of the peptides include a collagen peptide. Examples of the amino acids include taurine, cystine, cysteine, arginine, and glutamine. One kind or two or more kinds of these may be added.

Examples of the minerals include iron, sodium, potassium, calcium, magnesium, phosphorus, chlorine, zinc, iron, copper, and selenium. One kind or two or more kinds of these may be added.

Examples of the vitamins include vitamin A, vitamin D, vitamin E, vitamin K, vitamin B1, vitamin B2, vitamin B6, vitamin B12, vitamin C, niacin, folic acid, pantothenic acid, and biotin. One kind or two or more kinds of these may be added.

Examples of other food materials include cocoa powder, cacao powder, chocolate powder, microorganism powder containing useful microorganisms such as lactic acid bacteria and bifidobacteria, milk fermented ingredient powder made from a culture obtained by adding microorganisms to milk and fermenting the mixture, cheese powder having cheese as a powder, functional food powder having functional food as a powder, and total nutrition food powder having total nutrition food as a powder. One kind or two or more kinds of these may be added.

The solid food according to the present invention may be in the form of a food for daily ingestion, a health food, a health supplement food, a health functional food, a food for specified health use, a nutrient functional food, a supplement, a function-indicating food, or the like.

The solid food dissolved in water is also referred to as a solid dissolvable food.

As the food powder, a material that can be softened by heat at the time of irradiation with a laser light to be a non-crystalline rubber state can be appropriately used. Examples of such a food powder can include food powders including polysaccharides sugar, dextrin, natural sugar (trehalose or the like), and polysaccharides.

(Action and Effect of Solid Food)

The solid food of the present embodiment is a solid food having a solid form obtained by compression molding powder, in which an increase in total a food crystallization rate that is a difference of a crystal ratio with respect to a total weight on a surface of the solid food relative to a crystal ratio in an inner part of the solid food is 0.1% by weight or less.

In the solid food produced by performing a hardening treatment including a humidification treatment in which humidification is performed at a temperature of, for example, 100° C. or lower on a compression molded body of the food powder obtained by compression molding the food powder, the increase in total crystallization rate on the surface is a large value, but in the solid food of the present embodiment, the increase in total crystallization rate on the surface is 0.1% by weight or less, which is significantly small. Such a solid food can realize suitable solubility because the increase in total crystallization rate is small.

In addition, in the solid food of the present embodiment, the increase in total crystallization rate from the surface of the solid food to the inner part of the solid food is smaller than the increase in total crystallization rate on the surface, and is 0.1% by weight or less. Such a solid food can realize suitable solubility because the increase in total crystallization rate is small.

In addition, according to the solid food of the present embodiment, even when the solid food is hardened by a hardening treatment that has a small influence on the crystallization rate from the surface to the inner part of the solid food, it is possible to secure strength adequate to resist breakage during handling.

In the solid food of the present embodiment, the depth from the surface of the solid food at which the increase in total crystallization rate is zero or minimal is preferably 0.2 mm or less. As a result, more suitable solubility can be realized, and strength adequate to resist breakage during handling can be sufficiently secured.

First Example

Preparation of Example

A solid milk sample having a rectangular parallelepiped shape in which a side a in an X-axis direction is 31 mm, a side b in a Y-axis direction is 24 mm, and a side c in a Z-axis direction is 12.5 mm was prepared as each of Examples. The sizes of a die and a punch of a tablet press were adjusted to obtain the above-described sizes, and 5.4 g of a powdered milk was compression molded to form a compression molded body of the powdered milk. In the compression molding, the first compression in which the first compression distance $L_1$ was set to 12.6 mm and the first compression speed $V_1$ was set to 120 mm/s was performed and then the second compression in which the second compression distance $L_2$ was set to 0.6 mm and the second compression speed $V_2$ was set to 1.2 mm/s was performed. The compression molded body of the powdered milk thus obtained was irradiated with a laser light as a hardening treatment to obtain a solid milk sample subjected to a hardening treatment according to Example. In the irradiation conditions of the laser light, irradiation was performed at an energy density of 450 W/cm$^2$ using a semiconductor laser (wavelength: 808 nm, output maximum: 8,000 W) for 0.8 seconds.

Preparation of Comparative Example

A solid milk sample different only in that the humidification treatment at 75° C. (45 seconds) and the drying treatment at 80° C. were performed as the hardening treatment of Example was formed, and the solid milk sample was used as Comparative Example. In the drying treatment, the time was adjusted so that the amount corresponding to the increased weight at the time of humidification was dried out.
(Hardness of Each Sample)

The hardness evaluation of each sample of the solid milks according to Example and Comparative Example was performed using the above-described load cell tablet hardness tester. The hardness of each sample was about 50 N (the fracture stress was about 0.167 N/mm$^2$) and was sufficiently secured, and each same had hardness adequate to resist breakage during handling.
(Measurement of Increase in Total Crystallization Rate of Each Sample)

For each sample of the solid milks according to Example and Comparative Example, the profile of the increase Y in total crystallization rate in the direction of the depth X from the surface was determined by an X-ray diffraction (XRD) method. The increase in total crystallization rate is a difference of the crystal ratio with respect to the total weight in each depth from the surface of the solid milk relative to the crystal ratio in the inner part of the solid milk. Here, the weight (% by weight) of α-lactose crystals or β-lactose crystals per unit weight was determined. Incidentally, in the measurement performed by the XRD method, a measurement surface of each sample was cut for each XRD measurement by a thickness of 0.1 mm to determine the increase in total crystallization rate on the entire surface. The measurement surface was a cross-section having a size of 12.5 mm×24 mm.

The increase in total crystallization rate of each sample was measured by diffraction intensity on a surface exposed by cutting the surface of the solid milk by a thickness of 0.1 mm using a powder X-ray diffraction apparatus (XRD, SmartLab, Rigaku Corporation). The measurement method was a general method (concentration method), and the measurement was performed under the slit conditions such as the scan axis (2θ/θ), the mode (step), the range designation (absolute), the start (9.0000 deg), the end (13.5000 deg), the step (0.0200 deg), the speedometer count time (2.4), IS (1.000 deg), RSI (1.000 deg), RS2 (0.300 mm), the attenuator (open), the tube voltage (40 kv), and the tube current (30 mA).

As an analysis method, a weighted average (smoothed 7 points) BG removal (sonneveld-Visser method) processing was performed using analysis software "SmartLab StudioII", and then integrated intensity calculation (intrinsic peak of α-lactose crystal: 12.5, intrinsic peak of β-lactose crystal: 10.5) was performed. The increase in total crystallization rate is a difference of the crystal ratio with respect to the total weight in each depth from the surface of the solid milk relative to the crystal ratio in the inner part of the solid milk. Here, the weight (% by weight) of α-lactose crystals or β-lactose crystals per unit weight as crystals was determined.

Figure 7:
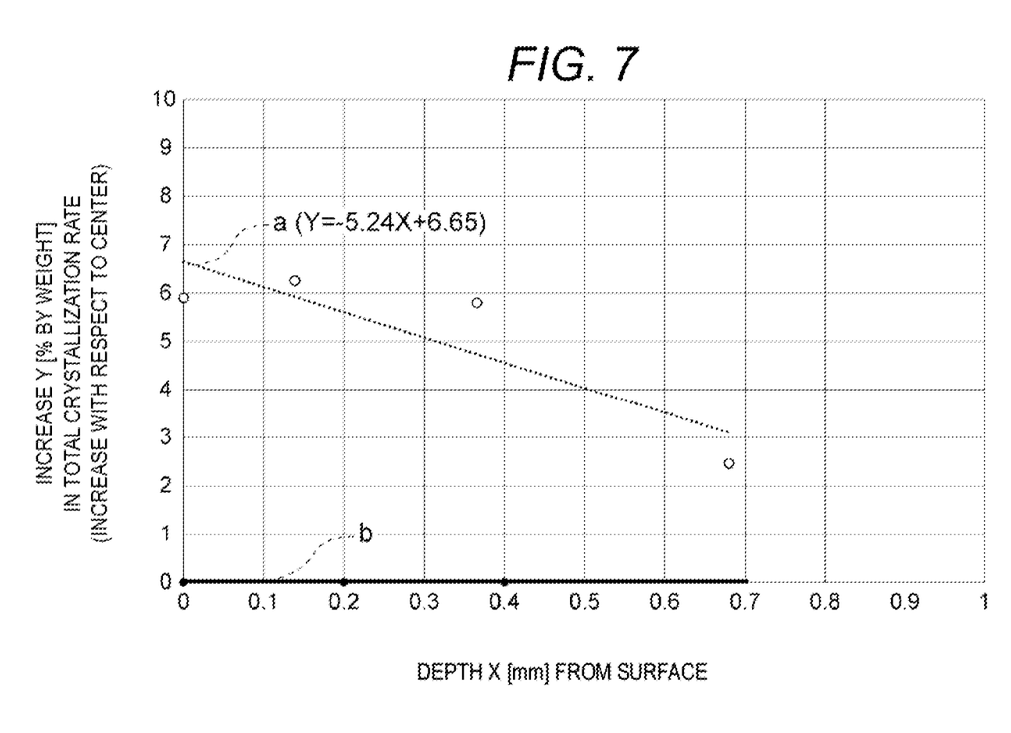
FIG. 7 is a graph showing an increase Y (% by weight) (increase with respect to the center) in total crystallization rate with respect to a depth X (mm) from a surface of a solid milk according to Example.

FIG. 7 is a graph showing the increase Y (% by weight) (increase with respect to the center) in total crystallization rate with respect to the depth X (mm) from the surface of the solid milk according to Example. The increase in total crystallization rate of Comparative Example is indicated by the symbol "○", and a graph obtained by approximating the increase in total crystallization rate by a least square method is indicated by a straight line a (Y=−5.24X+6.65). The increase in total crystallization rate of Example is indicated by the symbol "●", and a graph obtained by approximating the increase in total crystallization rate by a least square method is indicated by a straight line b.

As illustrated in FIG. 7, the increase in total crystallization rate from the surface of the solid milk to the inner part of the solid milk of Example was 0.1% by weight or less, and specifically, it was almost zero. The straight line b which is the graph of Example is approximated by y=0, and is located below the straight line a which is the graph of Comparative Example in a range in which at least the depth X from the surface is 0 to 1.0 mm. Suitable solubility was realized due to a small increase in total crystallization rate, and even when the solid milk was hardened by a hardening treatment that has a small influence on the crystallization rate from the surface to the inner part of the solid milk, strength adequate to resist breakage during handling was sufficiently secured. In addition, in the solid milk of Example, the depth from the surface of the solid milk at which the increase in total crystallization rate was zero or minimal was 0.2 mm or less. Therefore, more suitable solubility was realized, and strength adequate to resist breakage during handling was sufficiently secured.

(Solubility Test of Each Sample)

In order to perform evaluation of the solubility by the hardening conditions, a solubility test was performed on the solid milk samples of Example and Comparative Example prepared as described above. First, one solid milk sample was put in a stirring basket. The stirring basket is a bottomed tubular container with a lid which has an inner diameter of 30 mm and a height of 36 mm, and has a lateral part, a bottom part, and a lid part. The lateral part, the bottom part, and the lid part are formed with a stainless steel net having 18 meshes (opening: 1.01 mm). Four blades are evenly provided in the inner face of the lateral part of the stirring basket. Each of the four blades is a plate having a thickness of 1.5 mm, a width of 4 mm, and a length of 34 mm, is disposed so that the longitudinal direction becomes parallel to the central axis of the stirring basket, and is provided to protrude from the inner face of the lateral part toward the center thereof. In a state where the stirring basket was immersed in 200 ml of warm water (50±1° C.) contained in a 300 ml beaker so that the solid milk sample was completely submerged in water, the stirring basket was rotated at a rotation speed of 0.5 m/s (peripheral speed). The stirring basket was held at a height of 5 mm from the inner face of the beaker bottom part. The dissolution process from the solid milk sample starting to dissolve until the solid milk sample completely dissolving was measured at certain time intervals on the basis of electric conductivity.

Three samples of each of Examples and Comparative Example were subjected to the test, and each of 20% dissolution time ($t_{20}$), 63% dissolution time ($t_{63}$), and 95% dissolution time ($t_{95}$) was obtained from the average value of the three samples. The 20% dissolution time, the 63% dissolution time, and the 95% dissolution time of Comparative Example were respectively designated as reference values ($t_{20ref}$, $t_{63ref}$, and $t_{95ref}$), and the solubility index ($I_d$) was calculated on the basis of the following Formula (A). The 20% dissolution time ($t_{20ref}$), the 63% dissolution time ($t_{63ref}$), and the 95% dissolution time ($t_{95ref}$) of Comparative Example were 14 (sec), 32 (sec), and 93 (sec), respectively.

$$I_d = (t_{20}/t_{20ref} + t_{63}/t_{63ref} + t_{95}/t_{95ref})/3 \quad (A)$$

A general dissolution test of tablets (drugs) is performed by a time until the concentration reaches 85%, or comparing a time until the concentration reaches 60% and a time until the concentration reaches 85%. However, depending on differences in the product type and the production conditions of solid milks, dissolution may stagnate at the initial stage or it may take a time to finish dissolution. Therefore, as for the solid milks, it is not appropriate that the solubility is evaluated with one or two indices as in evaluating general tablets. In particular, prolongation of the dissolution time at the initial stage is a factor with which a user feels "hardly dissolved" in the sensory evaluation, and is important in evaluation of quality of solid milks.

In the formula representing the solubility index (Ia) described above, the 20% dissolution time was used for evaluation of the solubility at the initial stage of dissolution, the 63% dissolution time was used for evaluation of the solubility at the middle stage of dissolution, and the 95% dissolution time was used for evaluation of the solubility at the final stage of dissolution. The 63% dissolution time indicating the solubility at the middle stage of dissolution corresponds to a time constant $\tau$ in the general transient response and is widely known as a value indicating characteristics of responses in evaluation indices of response characteristics of various sensors. The 95% dissolution time indicating the solubility at the final stage of dissolution corresponds to an evaluation index indicating response characteristics in $3\tau$ with respect to the time constant t in theory. In the formula representing the solubility index ($I_d$) described above, by determining an arithmetic average of the dissolution times at the initial stage, the middle stage, and the final stage of dissolution, the solubility index ($I_d$) is defined as a comprehensive index indicating dissolution characteristics.

It is considered that the solubility is improved in Example because the obtained solubility index ($I_d$) is smaller than that in Example by 1, and the hardening treatment by irradiation with a laser light is performed.

(Free Fat Measurement Test)

In order to perform evaluation of the content ratio of free fat by the hardening conditions, the content ratio of free fat was measured for each solid milk sample of Example and Comparative Example prepared as described above. First, the solid milk was finely ground with a cutter with attention not to grind the solid milk down entirely. Thereafter, the ground solid milk was passed through a 32 mesh sieve. The milk obtained through the sieving step was used as a sample, and the content ratio of free fat was measured according to the method described in "Determination of Free Fat on the Surface of Milk Powder Particles", Analytical Method for Dry Milk Products, A/S NIRO ATOMIZER (1978). However, in the method for dissolving a solid milk (Niro Atomizer, 1978), the solvent for extraction was changed from carbon tetrachloride to n-hexane, and the extraction operation was changed depending on the change of the solvent. Incidentally, it is confirmed in "Investigation of measuring free fat in powdered milk", Shibata Mitsuho, Hatsumi Hama, Masami Imai, and Ikuru Toyoda, Nihon Shokuhin Kagaku Kougaku Kaishi Vol. 53, No. 10, 551 to 554 (2006) that the measurement results of the free fat do not change even if the solvent and the extraction operation are changed. It was confirmed that in the sample of Example, the content ratio of free fat is lower than that of Comparative Example. It is considered that the content ratio of free fat in Example is reduced due to the difference in conditions of the hardening treatment.

Second Example

A solid milk for the example was prepared in the same manner as that of First Example. The irradiation with the laser light as the hardening treatment was performed using a semiconductor laser, the output of the laser light was 100 W or more and 10,000 W or less, the energy density per 1 second of the irradiation time was 450 W/cm² or more and 10,000 W/cm² or less, and the irradiation time of the laser light was 0.01 seconds or longer and 20 seconds or shorter. When an increase in total crystallization rate that is a difference of a crystal ratio with respect to a total weight on a surface of the solid milk relative to a crystal ratio in an inner part of the solid milk at a depth of the surface of the solid milk thus obtained was measured, the increase in total crystallization rate was 0.1% by weight or less. In addition, the depth from the surface of the solid milk at which the increase in total crystallization rate was zero or minimal was 0.2 mm or less.

The hardness of the solid milk of Example thus prepared was ranged from 49 N to 52 N (the fracture stress at 50 N was 0.167 N/mm²), all of the solid milks had strength adequate to resist breakage during handling. A solubility test was performed for the prepared solid milk against the comparative example described in First Example in the same manner as that of First Example and it was confirmed that the solubility index ($I_d$) is less than 1.00 and is lower than that of comparative example. In addition, free fat measurement test was performed for the prepared solid milk in the same manner as that of First Example and it was confirmed that in all examples the content ratio of free fat is lower than that of comparative example.

Example of Embodiment

Incidentally, the present disclosure may have the following configuration. When the present disclosure has the following configuration, a solid food and a solid milk can have suitable solubility and strength adequate to resist breakage during handling.

(1) A solid food having a solid form obtained by compression molding a food powder, in which an increase in total crystallization rate that is a difference of a crystal ratio with respect to a total weight on a surface of the solid food relative to a crystal ratio in an inner part of the solid food is 0.1% by weight or less.

(2) The solid food according to (1), in which a depth from the surface of the solid food at which the increase in total crystallization rate is zero or minimal is 0.2 mm or less.

(3) A solid milk having a solid form obtained by compression molding a powdered milk, in which an increase in total crystallization rate that is a difference of a crystal ratio with respect to a total weight on a surface of the solid milk relative to a crystal ratio in an inner part of the solid milk is 0.1% by weight or less.

(4) The solid milk according to (3), in which a depth from the surface of the solid milk at which the increase in total crystallization rate is zero or minimal is 0.2 mm or less.

(5) A solid food having a solid form obtained by compression molding a food powder, in which the solid food is formed by performing a hardening treatment on a compression molded body of the food powder obtained by compression molding the food powder so that an increase in total crystallization rate that is a difference of a crystal ratio with respect to a total weight on a surface of the solid food relative to a crystal ratio in an inner part of the solid food is 0.1% by weight or less.

(6) A solid milk having a solid form obtained by compression molding a powdered milk, in which the solid milk is formed by performing a hardening treatment on a compression molded body of the powdered milk obtained by compression molding the powdered milk so that an increase in total crystallization rate that is a difference of a crystal ratio with respect to a total weight on a surface of the solid milk relative to a crystal ratio in an inner part of the solid milk is 0.1% by weight or less.

(7) A solid food having a solid form obtained by compression molding a food powder, in which a fracture stress of the solid food is 0.067 N/mm$^2$ or more and 0.739 N/mm$^2$ or less, and an increase in total crystallization rate that is a difference of a crystal ratio with respect to a total weight on a surface of the solid food relative to a crystal ratio in an inner part of the solid food is 0.1% by weight or less.

(8) A solid milk having a solid form obtained by compression molding a powdered milk, in which a fracture stress of the solid milk is 0.067 N/mm$^2$ or more and 0.739 N/mm$^2$ or less, and an increase in total crystallization rate that is a difference of a crystal ratio with respect to a total weight on a surface of the solid milk relative to a crystal ratio in an inner part of the solid milk is 0.1% by weight or less.

(9) A method for producing a solid food, the method including: compression molding a food powder to form a compression molded body of the food powder; and hardening the obtained compression molded body of the food powder by irradiation with a laser light.

(10) The method for producing a solid food according to (9), in which when the compression molded body of the food powder is hardened by the irradiation with the laser light, the compression molded body of the food powder is irradiated with a laser light having an energy density per 1 second of an irradiation time of 450 W/cm$^2$ or more.

(11) The method for producing a solid food according to (9) or (10), in which when the compression molded body of the food powder is hardened by the irradiation with the laser light, an irradiation time for irradiating the compression molded body of the food powder with a laser light is 0.01 seconds or longer and 20 seconds or shorter.

(12) A method for producing a solid milk, the method including: compression molding a powdered milk to form a compression molded body of the powdered milk; and hardening the obtained compression molded body of the powdered milk by irradiation with a laser light.

(13) The method for producing a solid milk according to (12), in which when the compression molded body of the powdered milk is hardened by the irradiation with the laser light, the compression molded body of the powdered milk is irradiated with a laser light having an energy density per 1 second of an irradiation time of 450 W/cm$^2$ or more.

(14) The method for producing a solid milk according to (12) or (13), in which when the compression molded body of the powdered milk is hardened by the irradiation with the laser light, an irradiation time for irradiating the compression molded body of the powdered milk with a laser light is 0.01 seconds or longer and 20 seconds or shorter.

(15) A solid dissolvable food having a solid form obtained by compression molding a food powder, in which an increase in total crystallization rate that is a difference of a crystal ratio with respect to a total weight on a surface of the solid dissolvable food relative to a crystal ratio in an inner part of the solid dissolvable food is 0.1% by weight or less.

(16) A solid food having a solid form obtained by compression molding a food powder, in which an increase in total crystallization rate that is a difference of a crystal ratio with respect to a total weight on a surface of the solid food relative to a crystal ratio in an inner part of the solid food is 0.1% by weight or less, and the solid food is softened by heat at the time of irradiation with a laser light to be in a non-crystalline rubber state.

REFERENCE SIGNS LIST

10 Body
10A First face
10B Second face
10C Lateral face
10S Solid milk

The invention claimed is:
1. A solid milk having a solid form obtained by compression molding a powdered milk, wherein an increase in total crystallization rate that is a difference in weight (% by weight) of α-lactose crystals and β-lactose crystals per unit weight on a surface of the solid milk relative to weight (% by weight) of α-lactose crystals and β-lactose crystals per unit weight in an inner part of the solid milk is 0.1% by weight or less, and
wherein a surface layer of the solid milk is a harder layer than the inner part, where the surface layer includes the surface, and wherein a depth from the surface of the solid milk at which the increase in total crystallization rate is zero to 0.1% is 0.2 mm or less.

2. The solid milk according to claim 1, wherein a depth from the surface of the solid milk at which the increase in total crystallization rate is zero is 0.2 mm or less.

* * * * *